US012441221B2

(12) United States Patent
Lin et al.

(10) Patent No.: US 12,441,221 B2
(45) Date of Patent: Oct. 14, 2025

(54) ARMREST ASSEMBLY AND VEHICLE HAVING SAME (71) Applicant: NIO TECHNOLOGY (ANHUI) CO., LTD, Hefei (CN)

(72) Inventors: Tingting Lin, Shanghai (CN); Kai Qiu, Shanghai (CN); Zhuangxun Qian, Shanghai (CN); Jianchao Di, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 188 days.

(21) Appl. No.: 18/325,469

(22) Filed: May 30, 2023

(65) Prior Publication Data

US 2023/0382280 A1    Nov. 30, 2023

(30) Foreign Application Priority Data

May 30, 2022  (CN) .......................... 202210600737.1

(51) Int. Cl.
*B60N 2/75* (2018.01)
*B60N 2/20* (2006.01)
*B60N 2/859* (2018.01)
*B60N 3/10* (2006.01)

(52) U.S. Cl.
CPC ............. *B60N 2/757* (2018.02); *B60N 2/206* (2013.01); *B60N 2/859* (2018.02); *B60N 3/102* (2013.01); *B60N 3/106* (2013.01)

(58) Field of Classification Search
CPC ......... B60N 2/206; B60N 3/102; B60N 2/844
See application file for complete search history.

(56) References Cited

U.S. PATENT DOCUMENTS

| 6,217,112 B1 * | 4/2001 | Linsenmeier | B60N 3/108 297/217.3 |
| 8,128,162 B2 * | 3/2012 | Gerhardt | B60N 2/757 297/410 |
| 8,376,435 B2 * | 2/2013 | Dexter | B60N 2/305 296/64 |

(Continued)

FOREIGN PATENT DOCUMENTS

| CN | 110481400 A | * 11/2019 | |
| CN | 112793486 A | * 5/2021 | B60N 2/75 |

(Continued)

*Primary Examiner* — Timothy J Brindley
(74) *Attorney, Agent, or Firm* — Sheridan Ross P.C.

(57) ABSTRACT

The disclosure relates to an armrest assembly and a vehicle having the armrest assembly. The armrest assembly is configured to be capable of holding a cup. The armrest assembly includes: an armrest body, wherein a cavity and an opening communicating with the cavity are arranged in the armrest body; a headrest, wherein the headrest is rotatably fixed to an end portion of the armrest body close to the opening, and a cup receptacle capable of receiving the cup is arranged on the back of the headrest; and a cup holder mechanism, wherein the cup holder mechanism has a cup holder arranged in the cavity, and the cup holder is ejectable from the opening to hold the cup. With the armrest assembly in the vehicle of the disclosure, the depth at which the cup is held can be increased, the holding effect can be improved, and the comfort and safety of the headrest can be ensured.

14 Claims, 8 Drawing Sheets

(56) References Cited

U.S. PATENT DOCUMENTS

| | | | |
|---|---|---|---|
| 8,979,203 B1 * | 3/2015 | Sutter, Jr. | B60N 2/844 |
| | | | 297/408 |
| 9,050,910 B2 * | 6/2015 | Kim | B60N 2/757 |
| 9,409,503 B2 * | 8/2016 | Little | B60N 2/844 |
| 9,616,786 B2 * | 4/2017 | Tanaka | B60N 2/5816 |
| 10,457,170 B2 * | 10/2019 | Line | B60N 3/004 |
| 10,875,434 B2 * | 12/2020 | Jeong | B60N 2/856 |
| 11,180,063 B2 * | 11/2021 | Brown | B60N 2/206 |
| 2010/0244502 A1 * | 9/2010 | Andersson | B60N 2/79 |
| | | | 297/118 |
| 2014/0210245 A1 * | 7/2014 | Tobata | B60N 2/844 |
| | | | 297/408 |
| 2017/0158101 A1 * | 6/2017 | Little | B60N 2/853 |
| 2018/0178700 A1 * | 6/2018 | Welch | B60N 3/102 |

FOREIGN PATENT DOCUMENTS

| | | | | |
|---|---|---|---|---|
| DE | 10344320 A1 * | 4/2005 | | B60N 2/206 |
| EP | 0860319 A1 * | 8/1998 | | |
| GB | 2395118 A * | 5/2004 | | A47C 7/405 |
| JP | 2006141855 A * | 6/2006 | | B60N 2/4606 |
| WO | WO-2021063665 A1 * | 4/2021 | | B60N 2/01 |

\* cited by examiner

ARMREST ASSEMBLY AND VEHICLE HAVING SAME

This application claims the benefit of China Patent application No. 202210600737.1 filed May 30, 2022, the entire contents of which are incorporated herein by reference in its entirety.

TECHNICAL FIELD

The disclosure relates to the technical field of vehicles, and in particular to an armrest assembly and a vehicle having the armrest assembly.

BACKGROUND

A vehicle in the prior art is usually equipped with a foldable armrest in the middle area of rear seats, allowing users to fold and unfold the armrest according to actual needs. When the armrest is folded, the space of the rear seats can be fully utilized. When the armrest is unfolded, the user can use the armrest to support their elbow conveniently, improving the user experience. Typically, a headrest is also provided at the top of the armrest to ensure the comfort and safety of the user.

To enhance the functionality of the armrest, an armrest with a cup holder function has been developed in the prior art. For example, the Chinese utility model patent CN 210258134 U discloses a rear center armrest-headrest structure with a cup holder. The rear center armrest-headrest structure includes a headrest and a cup holder assembly, and the cup holder assembly is arranged in the headrest in a concealable manner. The cup holder assembly can be unlocked from the headrest by an unlocking button, and then the user pulls the cup holder assembly out of the headrest by grasping a cup holder front plate. When the cup holder assembly is pulled out, a cup tray and a cup holder panel arranged on the cup assembly cooperate with each other to hold and limit a cup. However, the cup holder assembly in this rear center armrest-headrest mechanism is arranged inside the headrest, resulting in a limited depth at which the cup holder assembly can hold the cup and a poor holding effect. In addition, since the cup holder assembly occupies a part of the internal space of the headrest, the space originally used for arranging headrest components to ensure the comfort and safety is squeezed, resulting in a corresponding reduction in the comfort and safety of the headrest.

Therefore, there is a need for a novel technical solution to solve the problem described above.

BRIEF SUMMARY

In order to improve or, to some extent, solve the technical problems that, in the prior art, armrest assemblies have poor effect in holding a cup and headrests are poor in comfort and safety, the disclosure provides an armrest assembly. The armrest assembly is configured to be capable of holding a cup. The armrest assembly includes: an armrest body, wherein a cavity and an opening communicating with the cavity are arranged in the armrest body; a headrest, wherein the headrest is rotatably fixed to an end portion of the armrest body close to the opening, and a cup receptacle capable of receiving the cup is arranged on the back of the headrest; and a cup holder mechanism, wherein the cup holder mechanism has a cup holder arranged in the cavity, and the cup holder is ejectable from the opening to hold the cup.

The armrest assembly of the disclosure includes the armrest body, the headrest, and the cup holder mechanism. The cavity and the opening communicating with the cavity are arranged in the armrest body. The headrest is rotatably fixed to the end portion of the armrest body close to the opening so that the angle of the headrest can be adjusted according to actual needs to meet design requirements for storage and placement. Since the cup receptacle capable of receiving the cup is arranged on the back of the headrest, the headrest can be used to hold the cup conveniently, enhancing the functionality of the headrest. Moreover, when the headrest is idle, the cup receptacle may be covered with the headrest and prevented from being exposed to affect the appearance. The cup holder mechanism has a cup holder arranged in the cavity, and the cup holder is configured to be ejectable from the opening to hold the cup. With the above arrangement, the cup receptacle for receiving the cup and the cup holder mechanism for holding the cup are arranged on two components, i.e., the headrest and the armrest body, respectively. In one aspect, it is convenient to increase the depth at which the cup is held and ensure the holding effect by setting the relative position of the cup receptacle and the cup holder mechanism; and in another aspect, excessive occupation of the internal space of the headrest can also be avoided to ensure the comfort and safety of the headrest.

In a preferred technical solution of the armrest assembly described above, the headrest includes: a housing; and an insertion bar mechanism, wherein the insertion bar mechanism includes a cross bar extending in a width direction of the housing and fixed in the housing, and a first insertion bar and a second insertion bar extending in parallel into the cavity from two ends of the cross bar, respectively, and the cross bar is configured to be rotatable relative to the first insertion bar and the second insertion bar, enabling the headrest to rotate up to a predetermined angle relative to the armrest body. The cross bar is fixed in the housing of the headrest and rotatable relative to the first insertion bar and the second insertion bar so that the cross bar can be fixed to the armrest body and can also be rotated conveniently relative to the armrest body. In addition, by the cooperation between the first insertion bar and the second insertion bar, the height of the headrest on the armrest can also be adjusted to meet individual needs of users.

In a preferred technical solution of the armrest assembly described above, the headrest further includes an unlocking mechanism, the unlocking mechanism including: a first ratchet and a second ratchet, the first ratchet being fitted over the cross bar, and the second ratchet being rotatably fixed in the housing, wherein the headrest is locked when the second ratchet abuts against the first ratchet, and the headrest is unlocked when the second ratchet is disengaged from the first ratchet. The cooperation between the first ratchet and the second ratchet can facilitate locking and unlocking of the headrest.

In a preferred technical solution of the armrest assembly described above, the unlocking mechanism further includes: a fixed bracket fixed in the housing and provided with a through hole allowing the unlocking lever to pass through, wherein the second ratchet and the transmission member are both rotatably fixed to the fixed bracket. With the arrangement of the fixed bracket, the components such as the unlocking lever, the transmission member and the second ratchet achieve a stable and effective cooperation to improve the structure stability.

In a preferred technical solution of the armrest assembly described above, the transmission member has a force receiving end cooperating with the unlocking lever and a force applying end spaced apart from the force receiving end, and when the force receiving end receives an acting force from the unlocking lever, the force applying end is enabled to abut against the second ratchet such that the second ratchet is disengaged from the first ratchet. With the above arrangement, an external force applied to the unlocking button can be conveniently transferred to the second ratchet, achieving the cooperation between the second ratchet and the first ratchet.

In a preferred technical solution of the armrest assembly described above, the predetermined angle ranges from 50° to 60°. With the above arrangement, the predetermined angle has an appropriate range to meet industrial design requirements for storage and placement.

In a preferred technical solution of the armrest assembly described above, the cup holder mechanism further includes a cover plate and a bottom plate opposite each other and fixed in the cavity, and the cover plate and the bottom plate together enclose an inner cavity allowing the cup holder to slide therein. With the above arrangement, the cup holder is allowed to conveniently slide in the inner cavity that is enclosed by the cover plate and the bottom plate, thereby switching between an idle state and a working state.

In a preferred technical solution of the armrest assembly described above, the cup holder includes: a holder body, wherein a U-shaped recess capable of accommodating the cup and having an outward opening is arranged on each of two sides of the holder body; and fingers, wherein each finger cooperates with the corresponding U-shaped recess to define an accommodating space to accommodate the cup, and the finger abuts against the cup to apply a predetermined pressure to the cup when the cup is placed in the accommodating space. The U-shaped recess, arranged on the holder body and having an outward opening, can accommodate the cup conveniently. In addition, the finger can be arranged to prevent the cup from escaping from the U-shaped recess, improving the holding stability.

In a preferred technical solution of the armrest assembly described above, a guide rod extending vertically downward is formed at a lower part of each finger, and a guide slot cooperating with the guide rod is provided in the bottom plate. By the cooperation between the guide rod and the guide slot, the relative position of the finger can be ensured when the entire cup holder slides in the inner cavity, preventing a misalignment of the finger during sliding.

In a preferred technical solution of the armrest assembly described above, a limiting post extending vertically upward is formed on an upper surface of the holder body; a limiting member is arranged on the cover plate, and a limiting protrusion and a release recess surrounding the limiting protrusion are formed on the limiting member, wherein the limiting protrusion can abut against the limiting post to restrict the cup holder within the inner cavity, and the limiting post can slide along the release recess and be disengaged from the limiting protrusion to unlock the cup holder. By the cooperation between the limiting post and the limiting protrusion, the cup holder can be conveniently restricted within the inner cavity. Further, by the cooperation between the limiting post and the release recess, the cup holder can be unlocked conveniently.

In a preferred technical solution of the armrest assembly described above, a slider extending in a sliding direction of the holder body is arranged on a lower surface of the holder body, and a sliding slot capable of receiving the slider is arranged on the bottom plate. The above arrangement enables the holder body to slide more stably.

In a preferred technical solution of the armrest assembly described above, a plurality of guide rails spaced apart from each other in a direction perpendicular to the sliding direction are further arranged on the lower surface of the holder body, and guide protrusions cooperating with the corresponding guide rails are arranged on the bottom plate. The above arrangement enables further improvement of the stability of the holder body in sliding.

In a preferred technical solution of the armrest assembly described above, a buffer gear is further arranged on the lower surface of the holder body, and a buffer rack capable of cooperating with the buffer gear is arranged on the bottom plate. The cooperation between the buffer gear and the buffer rack may make the sliding process of the holder body smoother to improve user experience.

In a preferred technical solution of the armrest assembly described above, a plurality of rollers spaced apart from each other and rotatably fixed to the holder body are arranged on the side of the holder body away from the opening, and the cup holder mechanism further includes force applying coil springs, the force applying coil springs each having a first end fixed to the roller and a second end fixed to the bottom plate and close to the opening. After being unlocked from the inner cavity, the cup holder can be automatically ejected with a spring force of the force applying coil springs, without being pulled by the user, so that the user experience is improved.

In order to improve or, to some extent, solve the technical problems that, in the prior art, armrest assemblies have poor effect in holding a cup and headrests are poor in comfort and safety, the disclosure provides a vehicle. The vehicle includes an armrest assembly according to any one of the above technical solutions. With the armrest assembly in the vehicle of the disclosure, the depth at which the cup is held can be increased, the holding effect can be ensured, and the comfort and safety of the headrest can be ensured.

Solution 1:
1. An armrest assembly, characterized in that the armrest assembly is configured to be capable of holding a cup, the armrest assembly including:
   an armrest body, wherein a cavity and an opening communicating with the cavity are arranged in the armrest body;
   a headrest, wherein the headrest is rotatably fixed to an end portion of the armrest body close to the opening, and a cup receptacle capable of receiving the cup is arranged on the back of the headrest; and
   a cup holder mechanism, wherein the cup holder mechanism has a cup holder arranged in the cavity, and the cup holder is ejectable from the opening to hold the cup.

Solution 2:
2. The armrest assembly according to solution 1, characterized in that the headrest includes:
   a housing; and
   an insertion bar mechanism, wherein the insertion bar mechanism includes a cross bar extending in a width direction of the housing and fixed in the housing, and a first insertion bar and a second insertion bar extending in parallel into the cavity from two ends of the cross bar, respectively, and
   the cross bar is configured to be rotatable relative to the first insertion bar and the second insertion bar, enabling the headrest to rotate up to a predetermined angle relative to the armrest body.

Solution 3:
3. The armrest assembly according to solution 2, characterized in that the headrest further includes an unlocking mechanism, the unlocking mechanism including:
a first ratchet and a second ratchet, the first ratchet being fitted over the cross bar, and the second ratchet being rotatably fixed in the housing,
wherein the headrest is locked when the second ratchet abuts against the first ratchet, and the headrest is unlocked when the second ratchet is disengaged from the first ratchet.

Solution 4:
4. The armrest assembly according to solution 3, characterized in that the unlocking mechanism further includes:
an unlocking button, fixed to the housing in a retractable manner and having an unlocking lever extending in the width direction; and
a transmission member, rotatably fixed in the housing and configured to be capable of driving the second ratchet to rotate when driven by the unlocking lever.

Solution 5:
5. The armrest assembly according to solution 4, characterized in that the unlocking mechanism further includes:
a fixed bracket fixed in the housing and provided with a through hole allowing the unlocking lever to pass through, wherein the second ratchet and the transmission member are both rotatably fixed to the fixed bracket.

Solution 6:
6. The armrest assembly according to solution 4 or 5, characterized in that the transmission member has a force receiving end cooperating with the unlocking lever and a force applying end spaced apart from the force receiving end, and when the force receiving end receives an acting force applied from the unlocking lever, the force applying end is enabled to abut against the second ratchet such that the second ratchet is disengaged from the first ratchet.

Solution 7:
7. The armrest assembly according to solution 2, characterized in that the predetermined angle ranges from 50° to 60°.

Solution 8:
8. The armrest assembly according to solution 1, characterized in that the cup holder mechanism further includes a cover plate and a bottom plate opposite each other and fixed in the cavity, and the cover plate and the bottom plate together enclose an inner cavity allowing the cup holder to slide therein.

Solution 9:
9. The armrest assembly according to solution 8, characterized in that the cup holder includes:
a holder body, wherein a U-shaped recess capable of accommodating the cup and having an outward opening is arranged on each of two sides of the holder body; and fingers, wherein each finger cooperates with the corresponding U-shaped recess to define an accommodating space to accommodate the cup, and the finger abuts against the cup to apply a predetermined pressure to the cup when the cup is placed in the accommodating space.

Solution 10:
10. The armrest assembly according to solution 9, characterized in that a guide rod extending vertically downward is formed at a lower part of each finger, and a guide slot cooperating with the guide rod is provided in the bottom plate.

Solution 11:
11. The armrest assembly according to solution 8, characterized in that
a limiting post vertically extending upward is formed on an upper surface of the holder body;
a limiting member is arranged on the cover plate, and a limiting protrusion and a release recess surrounding the limiting protrusion are formed on the limiting member, wherein the limiting protrusion can abut against the limiting post to restrict the cup holder within the inner cavity, and the limiting post can slide along the release recess and be disengaged from the limiting protrusion to unlock the cup holder.

Solution 12:
12. The armrest assembly according to solution 8, characterized in that a slider extending in a sliding direction of the holder body is arranged on a lower surface of the holder body, and a sliding slot capable of receiving the slider is arranged on the bottom plate.

Solution 13:
13. The armrest assembly according to solution 8, characterized in that a plurality of guide rails spaced apart from each other in a direction perpendicular to the sliding direction are further arranged on the lower surface of the holder body, and guide protrusions cooperating with the corresponding guide rails are arranged on the bottom plate.

Solution 14:
14. The armrest assembly according to solution 8, characterized in that a buffer gear is further arranged on the lower surface of the holder body, and a buffer rack capable of cooperating with the buffer gear is arranged on the bottom plate.

Solution 15:
15. The armrest assembly according to any one of solutions 8 to 14, characterized in that a plurality of rollers spaced apart from each other and rotatably fixed to the holder body are arranged on the side of the holder body away from the opening, and the cup holder mechanism further includes force applying coil springs, the force applying coil springs each having a first end fixed to the roller and a second end fixed to the bottom plate and close to the opening.

Solution 16:
16. A vehicle, characterized in that the vehicle includes an armrest assembly according to any one of solutions 1 to 15.

BRIEF DESCRIPTION OF THE SEVERAL VIEWS OF THE DRAWINGS

Preferred implementations of the disclosure are described below with reference to the drawings, in which.

LIST OF REFERENCE SIGNS

100—armrest assembly; 10—armrest body; 11—armrest shell; 111—fixed end; 112—movable end; 12—cavity; 13—opening; 20—headrest; 21—housing; 211—front; 212—back; 2121—cup receptacle; 22—insertion bar mechanism; 221—cross bar; 222—first insertion bar; 223—second insertion bar; 23—unlocking structure; 231—unlocking button; 2311—pressing end; 2312—unlocking lever; 2313—button reset spring; 232—fixed bracket; 2321—through hole; 2322—via hole; 233—transmission member; 2331—force receiving end; 2332—force applying end; 2333—limiting end; 2334—transmission member rotating shaft; 234—first ratchet; 2341—first abutting face; 2342—first limiting end; 2343—second limiting end; 235—second ratchet; 2351—force receiving face; 2352—second abutting face; 2353—second ratchet rotating shaft; 236—protective sleeve; 237—cross bar reset spring; 2371—first end; 2372—second end; 24—toothed plate; 25—damper; 30—cup holder mechanism; 31—cover plate; 311—cover plate body; 312—limiting member; 3121—limiting protrusion; 31211—U-shaped limiting notch; 3122—release recess; 32—bottom plate; 321—bottom plate body; 322—sliding slot; 323—guide protrusion; 324—guide slot; 325—buffer rack; 33—inner cavity; 34—cup holder; 341—holder body; 341*a*—upper surface; 341*b*—lower surface; 3411—pressing rod; 3412—U-shaped recess; 3413—limiting post; 3414—slider; 3415—guide rail; 3416—buffer gear; 3417—roller; 342—finger; 3421—finger body; 3422—finger linking rod; 34221—guide rod; 3423—clamping spring; 343—accommodating space; 35—force applying coil spring; 351—first end; 352—second end; 36—fastener; and 200—cup.

DETAILED DESCRIPTION

Preferred implementations of the disclosure are described below with reference to the accompanying drawings. Those skilled in the art should understand that these implementations are only used to explain the technical principles of the disclosure, and are not intended to limit the scope of protection of the disclosure.

It should be noted that, in the description of the disclosure, the terms that indicate the direction or positional relationship, such as "upper", "lower", "left", "right", "inner", and "outer", are based on the direction or positional relationship shown in the figures, which is merely for ease of description instead of indicating or implying that the apparatus or element must have a particular orientation and be constructed and operated in a particular orientation, and therefore, should not be construed as limiting the disclosure. In addition, the terms "first" and "second" are used for descriptive purposes only, and cannot be construed as indicating or implying relative importance.

In addition, it should also be noted that, in the description of the disclosure, the terms "mount", "provide" and "connect" should be interpreted in a broad sense unless explicitly defined and limited otherwise, which, for example, may mean a fixed connection, a detachable connection or an integral connection; and may be a direct connection, an indirect connection by means of an intermediary, or internal communication between two elements. For those skilled in the art, the specific meanings of the foregoing terms in the disclosure can be interpreted according to a specific situation.

In order to improve or, to some extent, solve the technical problems that, in the prior art, armrest assemblies have poor effect in holding a cup and headrests are poor in comfort and safety, the disclosure provides an armrest assembly 100. The armrest assembly 100 is configured to be capable of holding a cup 200. The armrest assembly includes: an armrest body 10, wherein a cavity 12 and an opening 13 communicating with the cavity 12 are arranged in the armrest body 10; a headrest 20, wherein the headrest 20 is rotatably fixed to an end portion of the armrest body 10 close to the opening 13, and a cup receptacle 2121 capable of receiving the cup 200 is arranged on the back 212 of the headrest 20; and a cup holder mechanism 30, wherein the cup holder mechanism 30 has a cup holder 34 arranged in the cavity 12, and the cup holder 34 is ejectable from the opening 13 to hold the cup 200.

Figure 1:
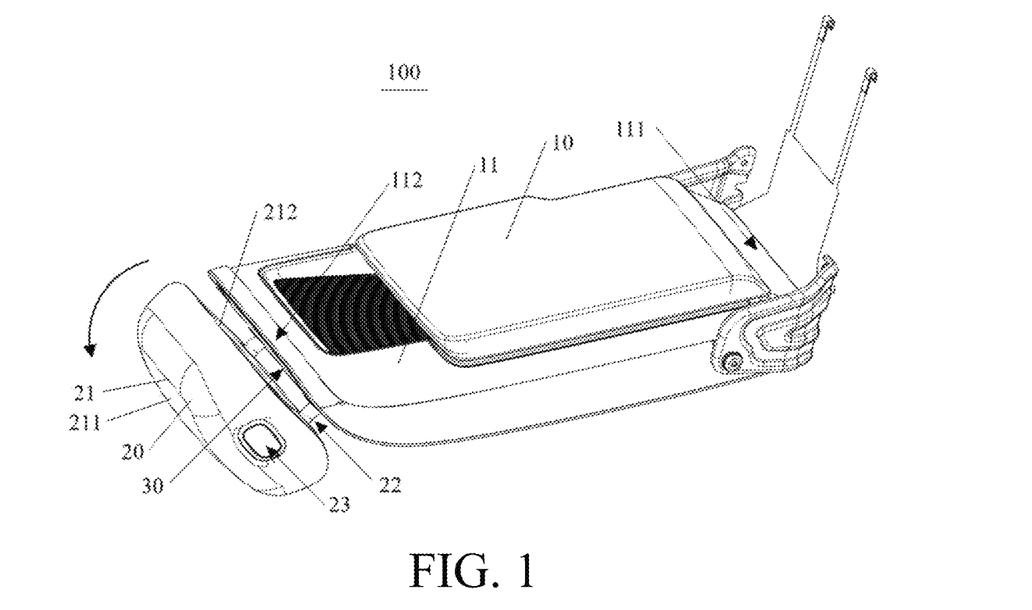
FIG. 1 is a schematic diagram of an embodiment of an armrest assembly in an idle state according to the disclosure.
Figure 2:
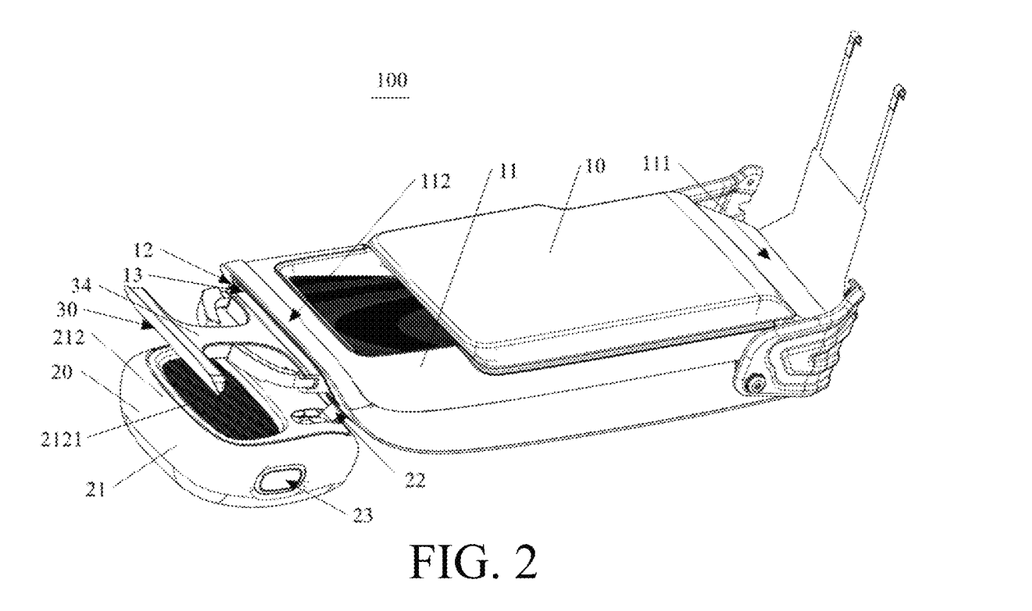
FIG. 2 is a schematic diagram of an embodiment of the armrest assembly in a working state according to the disclosure.
Figure 3:
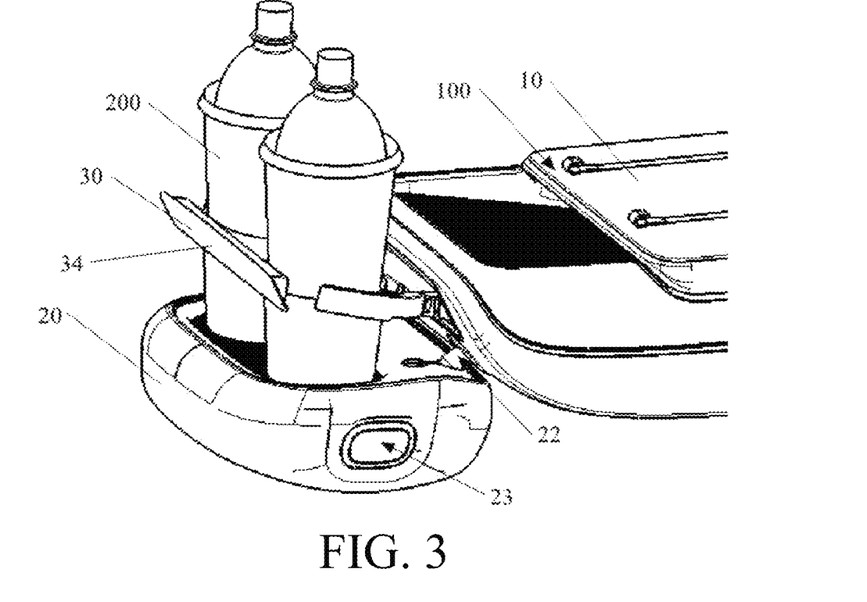
FIG. 3 is a schematic diagram of an embodiment of the armrest assembly holding cups according to the disclosure.

FIG. 1 is a schematic diagram of an embodiment of an armrest assembly in an idle state according to the disclosure; FIG. 2 is a schematic diagram of an embodiment of the armrest assembly in a working state according to the disclosure; and FIG. 3 is a schematic diagram of an embodiment of the armrest assembly holding cups according to the disclosure. As shown in FIGS. 1 to 3, in one or more embodiments, the armrest assembly 100 of the disclosure includes components such as an armrest body 10, a headrest 20, and a cup holder mechanism 30. The armrest body 10 is suitable to be rotatably fixed in the middle area of rear seats (not shown in the figure) of a vehicle (not shown in the figure). The armrest body 10 has an armrest shell 11. The armrest shell 11 has a fixed end 111 and a movable end 112 opposite each other. The fixed end 111 is rotatably fixed to the rear seats and the movable end 112 is enabled to rotate about the fixed end 111 by a predetermined angle so that the armrest body 10 can switch between an "idle position" abutting against the rear seats and a "working position" away from the rear seats. In one or more embodiments, the predetermined angle is 108°. Alternatively, the predetermined angle may be set to other proper angles greater than or less than 108°. The cavity 12 is formed inside the armrest shell 11 and close to the movable end 112 to facilitate the arrangement of the cup holder mechanism 30. The movable end 112 is further provided with the opening 13 communicating with the cavity 12 to enable the cup holder 34 of the cup holder mechanism 30 to be ejected from the opening 13 to hold the cup 200.

As shown in FIGS. 1 to 3, in one or more embodiments, the headrest 20 is rotatably fixed to the movable end 112 of the armrest body 10. The headrest 20 has a housing 21. The housing 21 is formed with components such as a face cover, foam and a plastic skeleton, to ensure the comfort and safety of the headrest 20. In an assembled state, the housing 21 has a front 211 facing away from the rear seats and a back 212 facing toward the rear seats. A cup receptacle 2121 extending vertically inward is formed on the back 212. When the armrest body 10 is in the idle position, the back 212 of the housing 21 abuts against the rear seats, so that the cup receptacle 2121 is effectively covered and prevented from being exposed to affect the appearance. When the armrest body 10 is in the working position, by adjusting the angle of the headrest 20, the back 212 of the housing 21 may substantially face toward the top of the vehicle, so that the cup 200 can be substantially placed in the cup receptacle 2121 horizontally, achieving the function of placement. In one or more embodiments, a non-slip pad (not identified in the figures) is also arranged at the bottom of the cup receptacle 2121 to increase a friction force between the cup 200 and the cup receptacle 2121.

Figure 4:
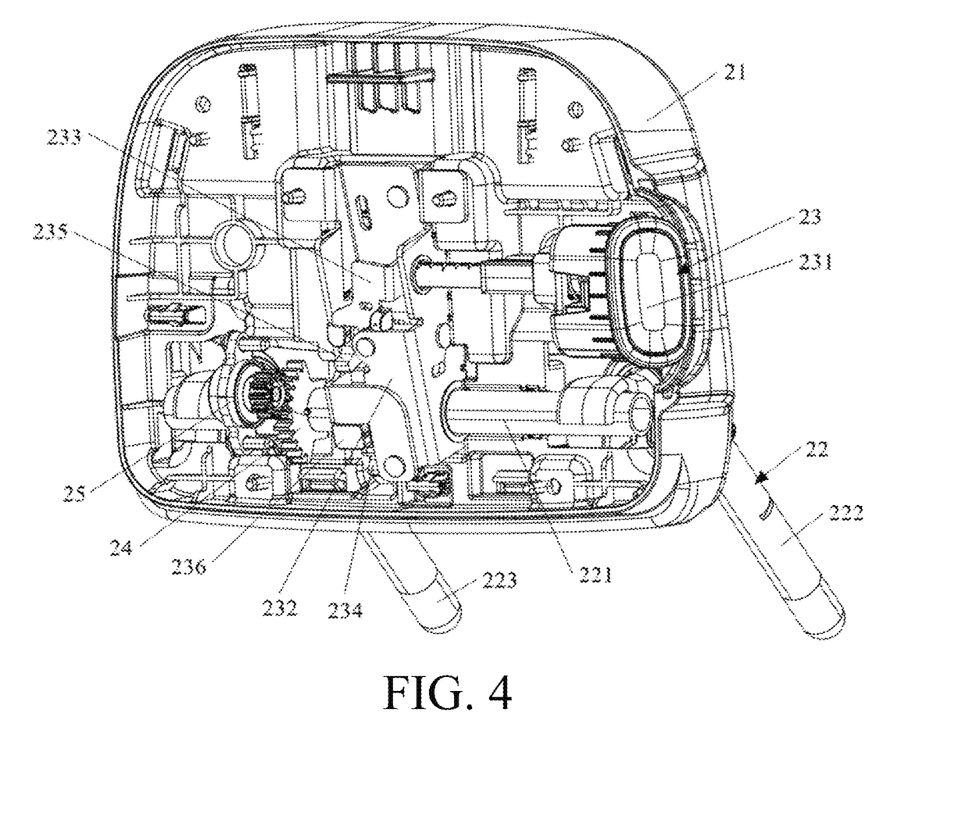
FIG. 4 is a schematic diagram of an internal structure of an embodiment of a headrest in the armrest assembly according to the disclosure.

FIG. 4 is a schematic diagram of an internal structure of an embodiment of a headrest in the armrest assembly according to the disclosure. As shown in FIG. 4, in one or more embodiments, the headrest 20 has an insertion bar mechanism 22. The insertion bar mechanism 22 includes a cross bar 221, a first insertion bar 222, and a second insertion bar 223. The cross bar 221 is fixed inside the housing 21 and extends substantially in a width direction of the housing 21 (based on the orientation shown in FIG. 4, i.e., a left-to-right direction). In one or more embodiments, the cross bar 221 is a hollow tube having a circular cross section. The cross bar 221 may be made of resin (e.g., ABS and PP), metal (e.g., stainless steel and aluminum alloy), or other suitable material. The first insertion bar 222 and the second insertion bar 223 are arranged at the two ends of the cross bar 221, respectively, and extend into the cavity 12 of the armrest body 10, so that a fixed connection is formed between the headrest 20 and the armrest body 10. The first insertion bar 222 and the second insertion bar 223 may be made of a suitable metal material such as stainless steel and aluminum alloy, to ensure their mechanical strength. In one or more embodiments, the height of the first insertion bar 222 and the second insertion bar 223 within the armrest body 10 is adjustable, allowing a user to adjust the height of the headrest 20 according to actual needs so as to meet the individualized needs. In addition, the cross bar 221 is configured to be rotatable relative to the first insertion bar 222 and the second insertion bar 223, enabling rotation of the headrest 20 up to a predetermined angle relative to the armrest body 10. In one or more embodiments, the predetermined angle ranges from 50° to 60°, so that the predetermined angle has an appropriate range to meet industrial design requirements for storage and placement.

Figure 5:
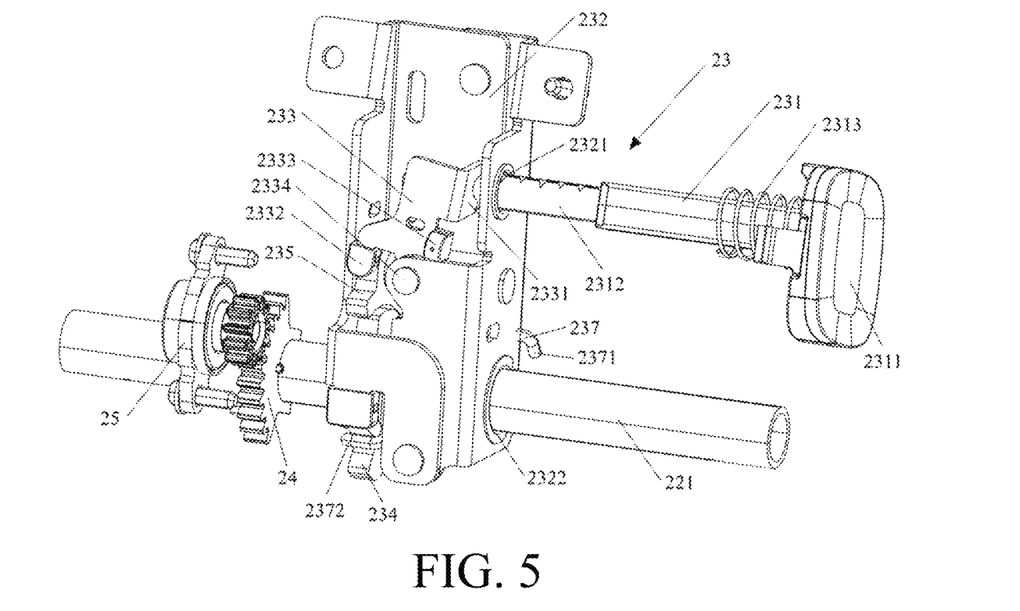
FIG. 5 is a schematic diagram of an embodiment of an unlocking structure in the armrest assembly according to the disclosure.
Figure 6:
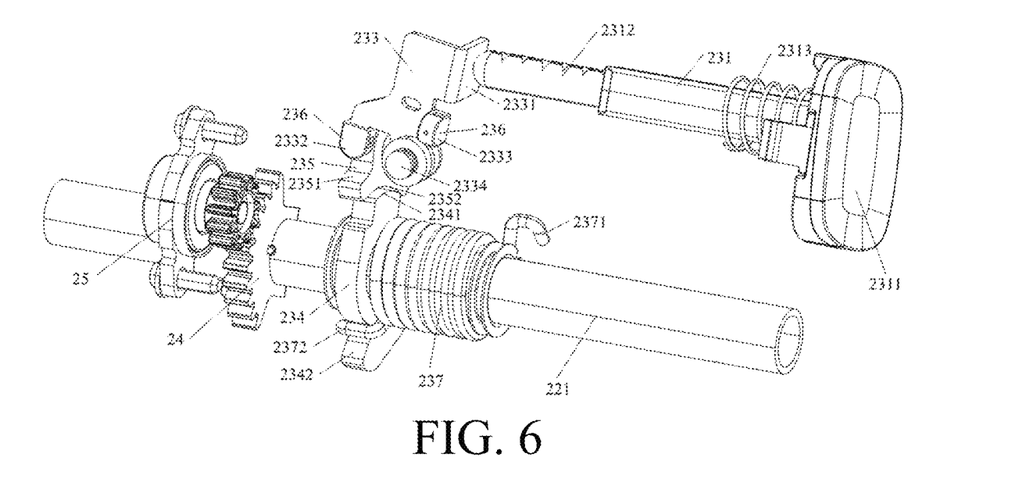
FIG. 6 is a first schematic diagram of an embodiment of the unlocking structure in the armrest assembly according to the disclosure with a fixed bracket removed.
Figure 7:
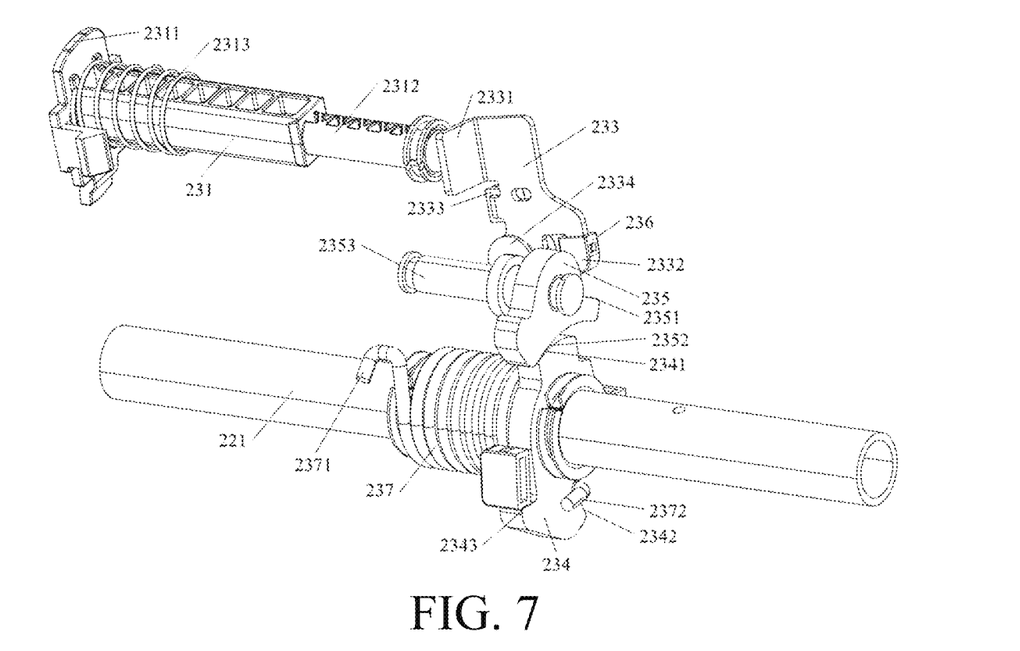
FIG. 7 is a second schematic diagram of an embodiment of the unlocking structure in the armrest assembly according to the disclosure with the fixed bracket removed.

FIG. 5 is a schematic diagram of an embodiment of an unlocking structure in the armrest assembly according to the disclosure; FIG. 6 is a first schematic diagram of an embodiment of the unlocking structure in the armrest assembly according to the disclosure with a fixed bracket removed; and FIG. 7 is a second schematic diagram of an embodiment of the unlocking structure in the armrest assembly according to the disclosure with the fixed bracket removed. As shown in FIGS. 4 to 7, in one or more embodiments, the headrest 20 includes an unlocking structure 23. The unlocking structure 23 includes components such as an unlocking button 231, a fixed bracket 232, a transmission member 233, a first ratchet 234, and a second ratchet 235. Alternatively, the unlocking structure 23 may also be of other suitable structure.

With continued reference to FIGS. 4 to 7, the unlocking button 231 is fixed to the housing 21 of the headrest 20 in a retractable manner. In one or more embodiments, the unlocking button 231 is located on the left side of the housing 21. Alternatively, the unlocking button 231 may also be arranged on the right side of the housing 21. The unlocking button 231 includes a pressing end 2311, an unlocking lever 2312 formed at the pressing end 2311, and a button reset spring 2313 fitted over the unlocking lever 2312. The unlocking lever 2312 extends from the inner side of the pressing end 2311 toward the inside of the housing 21, and has an extension direction substantially in parallel to the width direction of the housing 21. When the user presses the pressing end 2311, the unlocking lever 2312 is driven to move toward the inside of the housing 21, and then applies a force to the transmission member 233 of the unlocking mechanism 23. When an external force applied to the pressed end 2311 is withdrawn, the unlocking button 231 can spring back and reset under the action of the button reset spring 2313.

With continued reference to FIGS. 4 and 5, the fixed bracket 232 is fixed in the housing 21, and the transmission member 233 the second ratchet 235 are fixed to the fixed bracket 232 at an interval, making the structure of whole unlocking mechanism 23 more compact. The fixed bracket 232 may be made of any proper material such as stainless steel and aluminum alloy, so that the fixed bracket has a good mechanical strength. The fixed bracket 232 is provided with a through hole 2321 allowing the unlocking lever 2312 to pass through, so as to cooperate with the transmission member 233. The fixed bracket 232 is further provided with a via hole 2322 spaced apart from the through hole 2321, such that the cross bar 221 is allowed to pass through the fixed bracket 232 through the via hole 2322.

With continued reference to FIGS. 4 to 7, the transmission member 233 is rotatably fixed to the fixed bracket 232. The transmission member 233 may be made of a suitable metal material such as stainless steel and aluminum alloy, so that the transmission member has a good mechanical strength. Based on the orientation shown in FIG. 4, the transmission member 233 has a force receiving end 2331 extending substantially in a vertical direction and perpendicular to the width direction of the housing 21, so that the unlocking lever 2312 can abut against the force receiving end 2331 conveniently. The transmission member 233 also has a force applying end 2332 extending downwardly from the body of the transmission member 233 to apply an external force to the second ratchet 235. In one or more embodiments, the transmission member 233 is further provided with a limiting end 2333 that is spaced apart from the force receiving end 2331 and the force applying end 2332. The limiting end 2333 is configured to be enabled to abut against the fixed bracket 232 to define an initial position of the transmission member 233. In one or more embodiments, a protective sleeve 236 is fitted over each of the force applying end 2332 and the limiting end 2333 so that a flexible connection is formed between the transmission member 233 and the fixed bracket 232 and between the transmission member 233 and the second ratchet 235, respectively. The protective sleeve 236 may be made of a suitable material such as rubber and plastic. In addition, the transmission member 233 has a transmission member rotating shaft 2334 fixed to the fixed bracket 232 and extending substantially in a direction perpendicular to the back 212 of the housing 21. When an external force from the unlocking lever 2312 is applied to the force receiving end 2331, the transmission member 233 rotates counterclockwise (based on the orientation described in FIG. 4) about the rotating shaft 2334 under the lever action. In this process, the force applying end 2332 moves downward and then applies an external force to the second ratchet 235. When the external force from the unlocking lever 2312 is withdrawn, the transmission member 233 is configured to be capable of rotating clockwise about the rotating shaft 2334 under its own gravity (based on the orientation shown in FIG. 4) and abutting against the fixed bracket 232 (i.e., returning to the initial position), achieving resetting of the transmission member 233.

With continued reference to FIGS. 4 to 7, the first ratchet 234 is fitted over the cross bar 221 and forms a fixed connection with the cross bar 221. The first ratchet 234 may be made of a suitable metal material such as stainless steel, so that the first ratchet has e a good mechanical strength. A substantially curved first abutting face 2341 is formed on the top of the first ratchet 234 to match a second abutting face 2352 on the second ratchet 235. Specifically, when the first abutting face 2341 abuts against the second abutting face 2352, the first ratchet 234 and the second ratchet 235 are locked to each other and the cross bar 221 cannot rotate. When the second abutting face 2352 is disengaged from the first abutting face 2341, the first ratchet 234 and the second ratchet 235 are unlocked from each other and the cross bar 221 can rotate relative to the first insertion bar 222 and the second insertion bar 223. The first ratchet 234 further has a first limiting end 2342 and a second limiting end 2343 spaced apart from each other. Herein, the first limiting end 2342 and the second limiting end 2343 may abut against corresponding positions of the fixed bracket 232, respectively, to define an initial position and a rotation position of the first ratchet 234. In one or more embodiments, a protective sleeve 236 is fitted over the corresponding position of the fixed bracket 232 abutting against each of the first limiting end 2342 and the second limiting end 2343, so that a flexible connection is formed between the fixed bracket 232 and the first limiting end 2342 and the second limiting end 2343 to prevent damage to the components during rotation of the first ratchet 234.

With continued reference to FIGS. 4 to 7, the second ratchet 235 is rotatably fixed in the fixed bracket 232. The second ratchet 235 may be made of a suitable metal material, such as stainless steel, so that the second ratchet has a good mechanical strength. The second ratchet 235 has a force receiving face 2351 opposite the force applying end 2332 of the transmission member 233, so that the force applying end 2332 can apply an external force to the second ratchet 235 conveniently. A substantially curved second abutting face 2352 is also formed on the bottom of the second ratchet 235 to match the first abutting face 2341 on the first ratchet 234. The second ratchet 235 has a second ratchet rotating shaft 2353 fixed to the fixed bracket 232 and extending substantially in the width direction of the housing 21. With the above arrangement, when an acting force from the unlocking lever 2312 is applied to the transmission member 233, the force applying end 2332 of the transmission member 233 applies a corresponding acting force to the force applying face 2351 of the second ratchet 235, causing the second ratchet 235 to rotate about the second ratchet rotating shaft 2353. In this process, the second abutting face 2352 and the first abutting face 2341 that abut against each other are disengaged from each other and gradually move away from each other, achieving unlocking between the first ratchet 234 and the second ratchet 235.

With continued reference to FIGS. 5 to 7, a cross bar reset spring 237 is also fitted over the cross bar 221. The reset spring 237 has a first end 2371 fixed to the bottom of the fixed bracket 232 and a second end fixed to a position of the first ratchet 234 close to the first limiting end 2342. With the above arrangement, after being rotated, the cross bar 221 can be reset conveniently by the stress action of the cross bar reset spring 237 itself.

With continued reference to FIGS. 4 to 5, in one or more embodiments, a toothed plate 24 spaced apart from the first ratchet 234 is also fitted over the cross bar 221, and a damper 25 cooperating with the toothed plate 24 is also fixed in the housing 21. By the cooperation between the toothed plate 24 and the damper 25, the headrest 20 can be rotated more smoothly.

Figure 8:
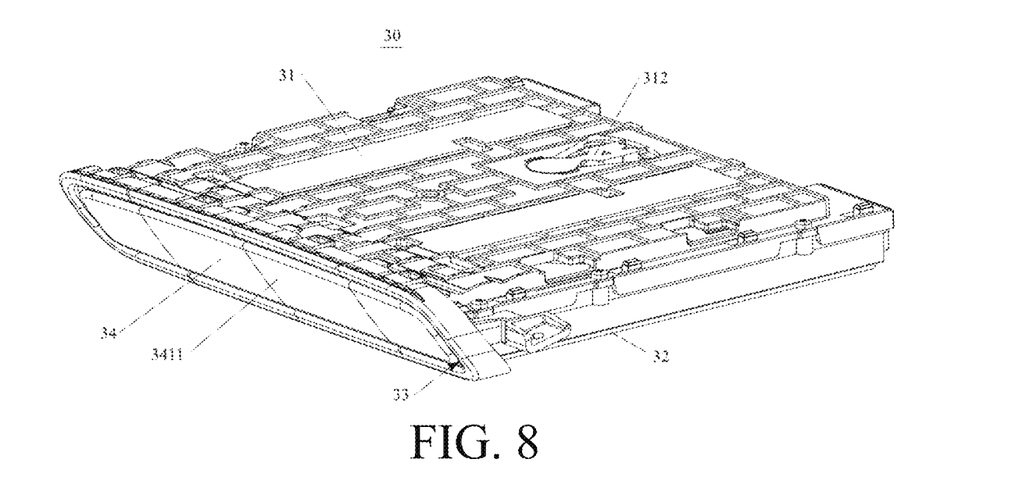
FIG. 8 is a schematic diagram of an embodiment of a cup holder mechanism in the armrest assembly according to the disclosure.
Figure 9:
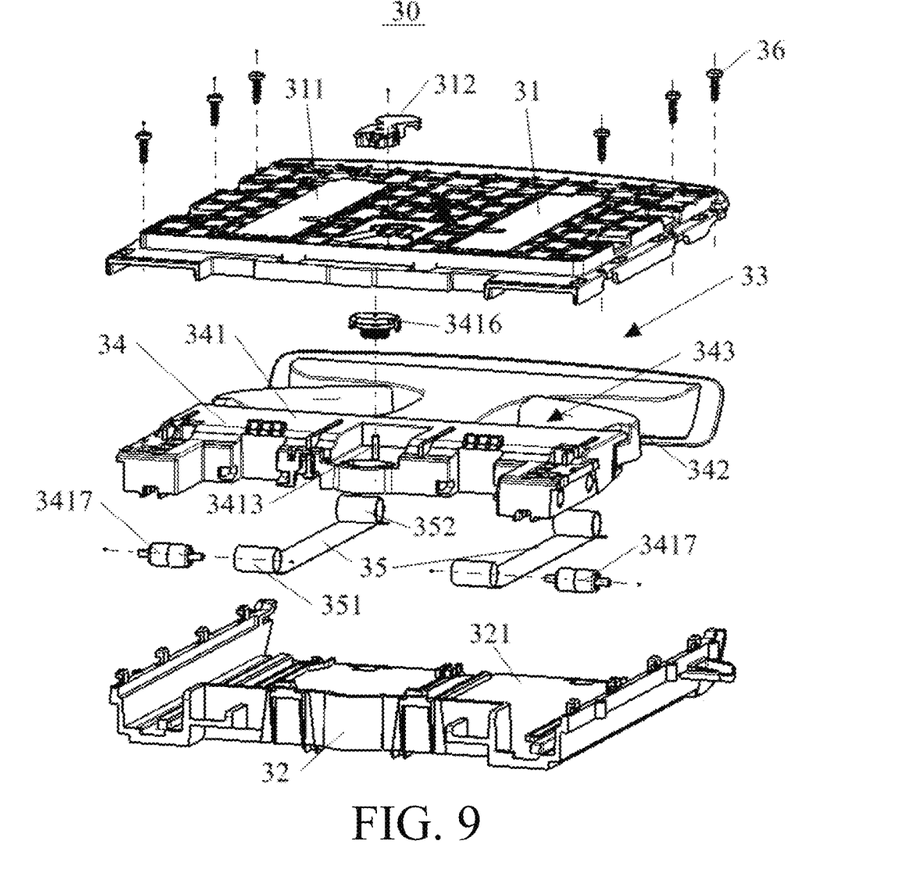
FIG. 9 is an exploded view of an embodiment of the cup holder mechanism in the armrest assembly according to the disclosure.

FIG. 8 is a schematic diagram of an embodiment of a cup holder mechanism in the armrest assembly according to the disclosure; and FIG. 9 is an exploded view of an embodiment of the cup holder mechanism in the armrest assembly according to the disclosure. As shown in FIGS. 8 and 9, in one or more embodiments, the cup holder mechanism 30 includes components such as a cover plate 31, a bottom plate 32, and a cup holder 34. The cover plate 31 and the bottom plate 32 are fixed in the cavity 12 of the armrest body 10. The cover plate 31 and the bottom plate 32 are arranged opposite each other to enclose an inner cavity 33 that allows the cup holder 34 to slide therein. In one or more embodiments, the cover plate 31 and the bottom plate 32 are connected to each other by six fasteners 36 spaced apart from each other. The fasteners 36 may be screws, bolts, rivets, etc. Alternatively, the number of the fasteners may be set to another suitable number greater or less than 6. Alternatively, the cover plate 31 and the bottom plate 32 may also be snap-fitted or fixed to each other by other suitable means.

Figure 10:
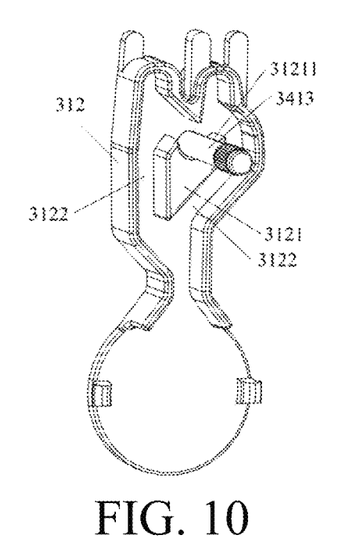
FIG. 10 is a schematic diagram of an embodiment of a limiting member and a limiting post in the armrest assembly according to the disclosure.

With continued reference to FIGS. 8 and 9, the cover plate 31 has a substantially plate-like cover plate body 311. The cover plate body 311 may be formed integrally by an injection molding process using a suitable resin material such as ABS and PP. A limiting member 312 is arranged on the cover body 311. The limiting member 312 is configured to cooperate with a limiting post 3413 on the cup holder 34 to achieve locking and unlocking of the cup holder 34. FIG. 10 is a schematic diagram of an embodiment of a limiting member and a limiting post in the armrest assembly according to the disclosure. As shown in FIG. 10, in one or more embodiments, a limiting protrusion 3121 is formed on the limiting member 312, the limiting protrusion extending vertically downward from a lower surface of the limiting member. In the assembled state, the limiting protrusion 3121 has a U-shaped limiting notch 31211 facing a direction away from the opening 13. The U-shaped limiting notch 31211 is configured to be capable of receiving the limiting post 3413 to achieve locking of the cup holder 34. In addition, a release recess 3122 surrounding the limiting protrusion 3121 is arranged on the limiting member 312, so that when an external force is applied to the cup holder 34, the limiting post 3413 can be disengaged from the U-shaped limiting notch 31211 and separated from the limiting protrusion 3121 along the release recess 3122, achieving unlocking of the cup holder 34.

Figure 11:
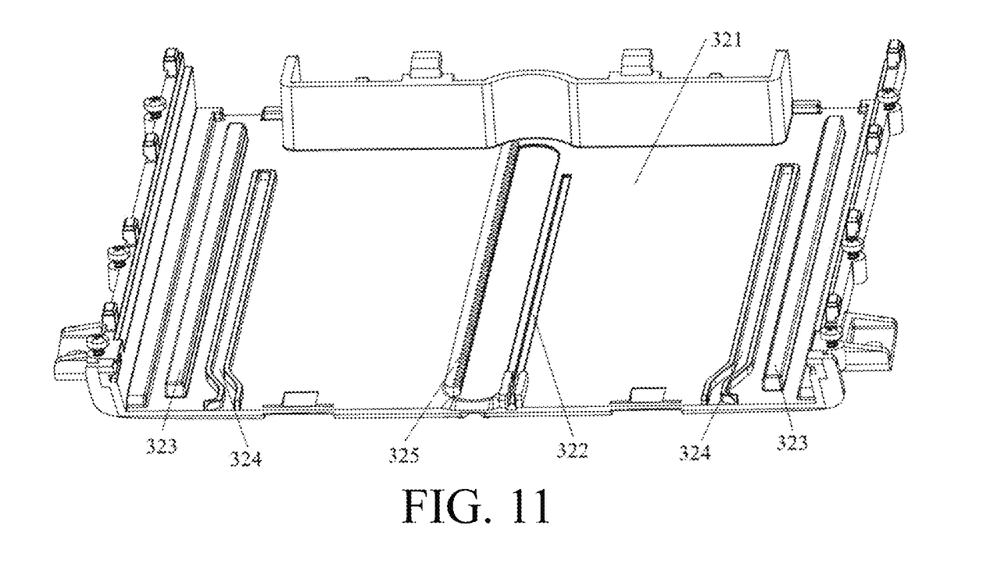
FIG. 11 is a schematic diagram of an embodiment of a bottom plate in the armrest assembly according to the disclosure.

FIG. 11 is a schematic diagram of an embodiment of a bottom plate in the armrest assembly according to the disclosure. As shown in FIGS. 8, 9, and 11, in one or more embodiments, the bottom plate 32 has a substantially plate-like bottom plate body 321. The bottom plate body 321 may be formed integrally by an injection molding process using a suitable resin material such as ABS and PP. In one or more embodiments, a sliding slot 322 extending in a sliding direction (based on the orientation shown in FIG. 11, i.e., a front-to-back direction) of the cup holder 34 is formed in the middle of the bottom plate body 32 to cooperate with a slider 3414 on the cup holder 34. In one or more embodiments, a buffer rack 325 spaced apart from the sliding slot 322 is arranged in the middle of the bottom plate body 32. The buffer rack 325 extends substantially in the sliding direction of the cup holder 34 and cooperates with a buffer gear 3416 on the cup holder 34. In one or more embodiments, guide protrusions 323 extending substantially in the sliding direction of the cup holder 34 are respectively arranged on the left and right sides of the bottom plate body 32. Each guide protrusion 323 may cooperate with a corresponding guide rail 3415 on the cup holder 34. In one or more embodiments, guide slots 324 that are spaced apart from the guide protrusions 323 are also respectively arranged on the left and right sides of the bottom plate body 32. Each guide slot 324 is configured to cooperate with a guide rod 34221 arranged on a finger 342 of the cup holder 34. In addition, near the opening 13, each guide slot 324 has a flared guide opening (not identified in the figure), so that the guide rod 34221 can be easily inserted into the corresponding guide slot 324, allowing the ejected finger 342 to be easily accommodated into the inner cavity 33.

Figure 12:
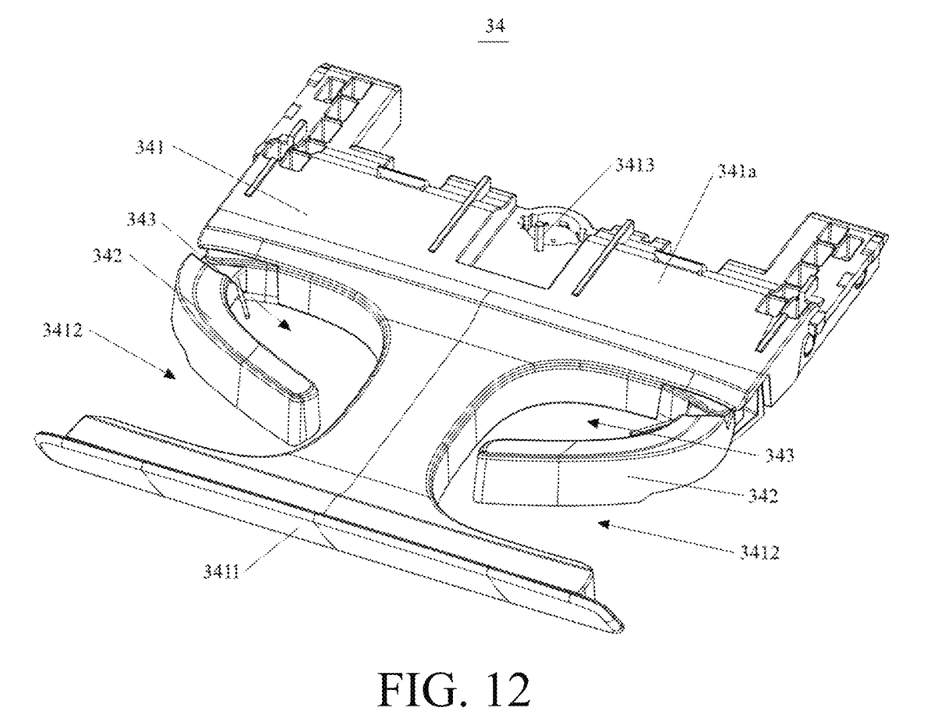
FIG. 12 is a schematic diagram of a front structure of an embodiment of a cup holder in the armrest assembly according to the disclosure.
Figure 13:
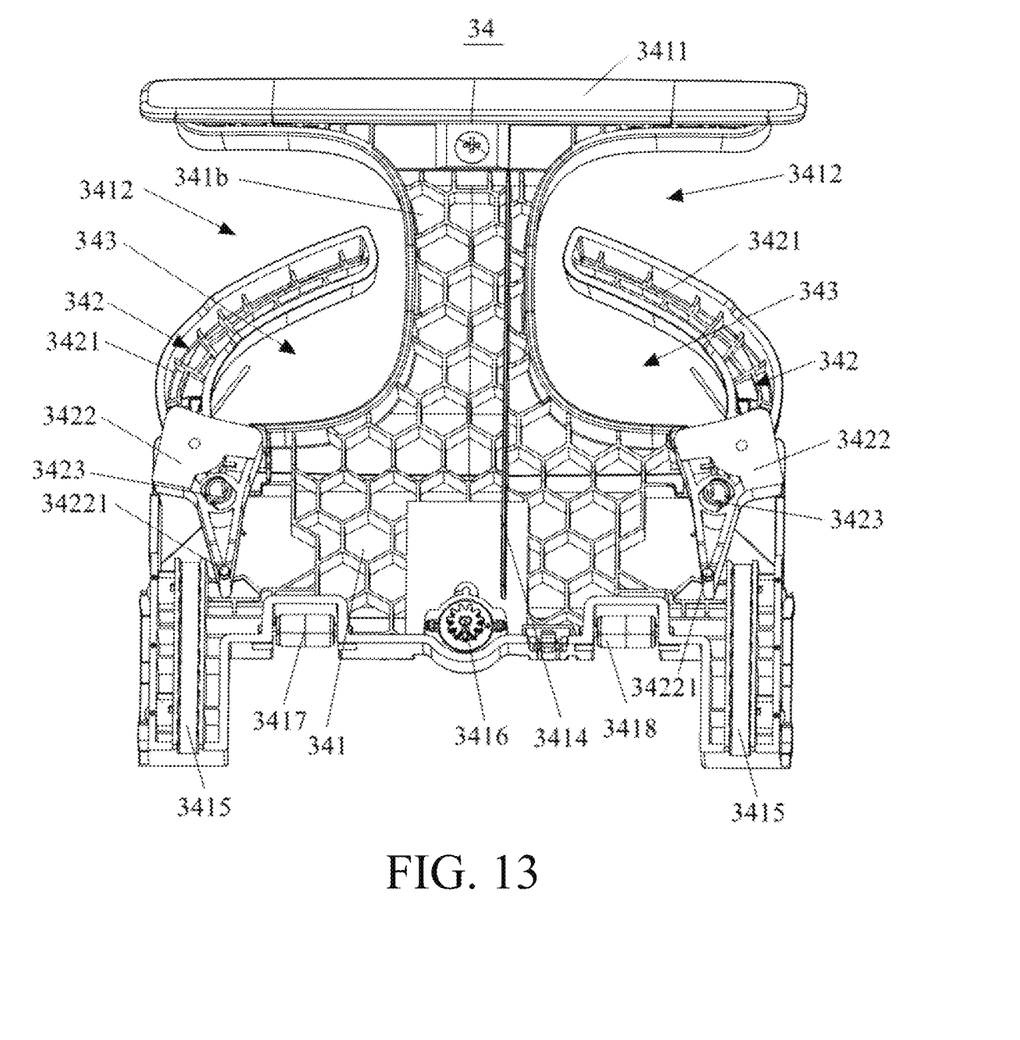
FIG. 13 is a schematic diagram of a back structure of an embodiment of the cup holder in the armrest assembly according to the disclosure.

FIG. 12 is a schematic diagram of a front structure of an embodiment of a cup holder in the armrest assembly according to the disclosure; and FIG. 13 is a schematic diagram of a back structure of an embodiment of the cup holder in the armrest assembly according to the disclosure. As shown in FIGS. 12 and 13, in one or more embodiments, the cup holder 34 includes a holder body 341 and fingers 342 respectively arranged on the left and right sides of the holder body 341. The holder body 341 may be formed integrally by an injection molding process using a suitable resin material such as ABS and PP. A pressing rod 3411 capable of cooperating with the opening 13 is formed at one end of the holder body 341. Based on the direction shown in FIG. 13, the pressing rod 3411 extends substantially in the left-to-right direction. With the pressing rod 3411, the user can easily apply an external force to the holder body 341, such that the holder body 341 can be ejected from the inner cavity 343. A U-shaped recess 3412 with an outward opening is formed on each of the left and right sides of the holder body 341 near the pressing rod 3411 to receive the cup 200. The holder body 341 has an upper surface 341a and a lower surface 341b opposite each other. In the assembled state, the upper surface 341a faces toward the cover plate 31 and the lower surface 341b faces toward the bottom plate 32. A limiting post 3413 extending vertically upward is formed in the middle of the upper surface 341a and located at the end away from the pressing rod 3411. The limiting post 3413 is substantially cylindrical to cooperate with the limiting member 312 arranged on the cover plate 31.

With continued reference to FIG. 13, in one or more embodiments, a slider 3414 extending vertically outward is formed on the lower surface 341b of the holder body 341. The slider 3414 is arranged in the middle of the lower surface 341b and extends substantially in the sliding direction of cup holder 34. The slider 3414 is inserted into the sliding slot 322 of the bottom plate 32 to restrain the sliding direction of the cup holder 34. Alternatively, the number of sliders 3414 may be set to a plurality, such as 2 and 3, as long as they can match the corresponding sliding slots 322 on the bottom plate 32. In one or more embodiments, two guide rails 3415 located on the left and right sides, respectively, are also arranged on the lower surface 341b. Each guide rail 3415 may receive a corresponding guide protrusion 323 on the bottom plate 32 to further improve the stability of the cup holder 34 in sliding. Alternatively, the number of guide rails 3415 may also be set to other suitable number more or less than 2, as long as they can match the guide protrusions 323 on the bottom plate 32. In one or more embodiments, a buffer gear 3416 rotatably fixed to the holder body 341 is further arranged on the lower surface 341b of the holder body 341 to cooperate with the buffer rack 325 on the bottom plate 32, making the cup holder 34 smoother when sliding inside the inner cavity 33 (especially when being ejected from the inner cavity 33).

With continued reference to FIGS. 9 and 13, in one or more embodiments, rollers 3417 that are respectively located on the left and right sides are arranged on the end portion of the side of the holder body 341 away from the pressing rod 3411. Each roller 3417 is rotatably fixed to the holder body 341, and the axis of rotation of each roller 3417 extends substantially in the left-to-right direction (based on the orientation shown in FIG. 13). In addition, the cup holder mechanism 30 further includes force applying coil springs 35 cooperating with the rollers 3417, so that the cup holder 34 can be automatically ejected from the inner cavity 33 by the elasticity of the force applying coil springs 35 after the cup holder is unlocked. Specifically, each force applying coil spring 35 extends substantially in the sliding direction of the cup holder 34. Each force applying coil spring 35 also has a first end 351 and a second end 352 opposite each other. The first end 351 is fixed to the corresponding roller 3417 and the second end 352 is fixed to a position of the bottom plate 32 close to the opening 13.

With continued reference to FIGS. 12 and 13, in one or more embodiments, the fingers 342 are arranged on the left and right sides of the holder body 341 and cooperate with corresponding U-shaped recesses 3412, respectively, to enclose an accommodating space 343 for holding the cup 200. Each finger 342 includes components such as a finger body 3421, a finger linking rod 3422, and a clamping spring 3423. The finger body 3421 is substantially curved and extends toward the corresponding U-shaped recess 3412. The finger body 3421 is rotatably fixed to the finger linking rod 3422 so that cups of different sizes can be held by rotating the fingers 3421. The finger linking rod 3422 is fixed to the lower surface 341b of the holder body 341. In one or more embodiments, a guide rod 34221 extending vertically outward is formed at a lower part of the finger linking rod 3422. The guide rod 34221 is substantially cylindrical to cooperate with the guide slot 324 on the bottom plate 32, allowing the finger 342 to have a stable relative position when sliding together with the holder body 341. The clamping spring 3423 is arranged between the finger body 3421 and the finger linking rod 3422, and the clamping spring 3423 is configured to apply a predetermined elastic force to the finger 342 when the finger 342 is rotated under an external force and fitted with the corresponding U-shaped recess 3412 to hold the cup 200, so that the finger 342 applies a predetermined pressure to the cup 200 to firmly and stably hold the cup 200.

The disclosure further provides a vehicle (not shown in the figures). The vehicle includes an armrest assembly 100 according to any one of the above embodiments. The armrest assembly 100 is arranged in the middle area of rear seats of the vehicle. In one or more embodiments, the vehicle is an electric vehicle. Alternatively, the vehicle may be a hybrid vehicle, a fuel vehicle, or another proper vehicle. The vehicle may be a car, an SUV, an MPV or other suitable vehicles.

Heretofore, the technical solutions of the disclosure have been described with reference to the preferred implementations shown in the accompanying drawings. However, those skilled in the art can readily understand that the scope of protection of the disclosure is apparently not limited to these specific implementations. Those skilled in the art may make equivalent changes or substitutions to the related technical features without departing from the principle of the disclosure, and all the technical solutions with such changes or substitutions shall fall within the scope of protection of the disclosure.

What is claimed is:

1. An armrest assembly, which is configured to be capable of holding a cup, the armrest assembly comprising:
   an armrest body, wherein a cavity and an opening communicating with the cavity are arranged in the armrest body;
   a headrest, wherein the headrest is rotatably fixed to an end portion of the armrest body close to the opening, and a cup receptacle capable of receiving the cup is arranged on a back of the headrest; and
   a cup holder mechanism, wherein the cup holder mechanism has a cup holder arranged in the cavity, and the cup holder is ejectable from the opening to hold the cup;
   wherein the cup holder mechanism further comprises a cover plate and a bottom plate opposite each other and fixed in the cavity, and the cover plate and the bottom plate together enclose an inner cavity allowing the cup holder to slide therein; and
   wherein the cup holder comprises:
   a holder body, wherein a U-shaped recess capable of accommodating the cup and having an outward opening is arranged on each of two sides of the holder body; and
   fingers, wherein each finger cooperates with a corresponding U-shaped recess to define an accommodating space to accommodate the cup, and each finger abuts against the cup to apply a predetermined pressure to the cup when the cup is placed in the accommodating space.

2. The armrest assembly according to claim 1, wherein the headrest comprises:
   a housing; and
   an insertion bar mechanism, wherein the insertion bar mechanism comprises a cross bar extending in a width direction of the housing and fixed in the housing, and a first insertion bar and a second insertion bar extending in parallel into the cavity from two ends of the cross bar, respectively, and
   the cross bar is configured to be rotatable relative to the first insertion bar and the second insertion bar, enabling the headrest to rotate up to a predetermined angle relative to the armrest body.

3. The armrest assembly according to claim 2, wherein the headrest further comprises an unlocking mechanism, the unlocking mechanism comprising:
   a first ratchet and a second ratchet, the first ratchet being fitted over the cross bar, and the second ratchet being rotatably fixed in the housing,
   wherein the headrest is locked when the second ratchet abuts against the first ratchet, and the headrest is unlocked when the second ratchet is disengaged from the first ratchet.

4. The armrest assembly according to claim 3, wherein the unlocking mechanism further comprises:
   an unlocking button, fixed to the housing in a retractable manner and having an unlocking lever extending in the width direction; and
   a transmission member, rotatably fixed in the housing and configured to be capable of driving the second ratchet to rotate when driven by the unlocking lever.

5. The armrest assembly according to claim 4, wherein the unlocking mechanism further comprises:
   a fixed bracket fixed in the housing and provided with a through hole allowing the unlocking lever to pass through, wherein the second ratchet and the transmission member are both rotatably fixed to the fixed bracket.

6. The armrest assembly according to claim 4, wherein the transmission member has a force receiving end cooperating with the unlocking lever and a force applying end spaced apart from the force receiving end, and
   when the force receiving end receives an acting force applied from the unlocking lever, the force applying end is enabled to abut against the second ratchet such that the second ratchet is disengaged from the first ratchet.

7. The armrest assembly according to claim 2, wherein the predetermined angle ranges from 50° to 60°.

8. The armrest assembly according to claim 1, characterized in that a guide rod extending vertically downward is formed at a lower part of each finger, and a guide slot cooperating with the guide rod is provided in the bottom plate.

9. The armrest assembly according to claim 1, characterized in that
   a limiting post vertically extending upward is formed on an upper surface of the holder body;
   a limiting member is arranged on the cover plate, and a limiting protrusion and a release recess surrounding the limiting protrusion are formed on the limiting member,
   wherein the limiting protrusion can abut against the limiting post to restrict the cup holder within the inner cavity, and the limiting post can slide along the release recess and be disengaged from the limiting protrusion to unlock the cup holder.

10. The armrest assembly according to claim 1, characterized in that a slider extending in a sliding direction of the holder body is arranged on a lower surface of the holder body, and a sliding slot capable of receiving the slider is arranged on the bottom plate.

11. The armrest assembly according to claim 1, characterized in that a plurality of guide rails spaced apart from each other in a direction perpendicular to a sliding direction are further arranged on a lower surface of the holder body, and guide protrusions cooperating with corresponding guide rails are arranged on the bottom plate.

12. The armrest assembly according to claim 1, characterized in that a buffer gear is further arranged on a lower surface of the holder body, and a buffer rack capable of cooperating with the buffer gear is arranged on the bottom plate.

13. The armrest assembly according to claim 1, characterized in that a plurality of rollers spaced apart from each other and rotatably fixed to the holder body are arranged on the side of the holder body away from the opening, and the cup holder mechanism further includes force applying coil springs, the force applying coil springs each having a first end fixed to the roller and a second end fixed to the bottom plate and close to the opening.

14. A vehicle, comprising an armrest assembly configured to be capable of holding a cup, wherein the armrest assembly comprises:

an armrest body, wherein a cavity and an opening communicating with the cavity are arranged in the armrest body;

a headrest, wherein the headrest is rotatably fixed to an end portion of the armrest body close to the opening, and a cup receptacle capable of receiving the cup is arranged on a back of the headrest; and a cup holder mechanism, wherein the cup holder mechanism has a cup holder arranged in the cavity, and the cup holder is ejectable from the opening to hold the cup;

wherein the cup holder mechanism further comprises a cover plate and a bottom plate opposite each other and fixed in the cavity, and the cover plate and the bottom plate together enclose an inner cavity allowing the cup holder to slide therein; and wherein the cup holder comprises:

a holder body, wherein a U-shaped recess capable of accommodating the cup and having an outward opening is arranged on each of two sides of the holder body; and fingers, wherein each finger cooperates with a corresponding U-shaped recess to define an accommodating space to accommodate the cup, and each finger abuts against the cup to apply a predetermined pressure to the cup when the cup is placed in the accommodating space.

* * * * *